United States Patent Office 3,383,364
Patented May 14, 1968

3,383,364
PROCESS OF PREPARING FORMALDEHYDE-CARBON MONOXIDE COPOLYMER
Joseph F. Nelson and Isidor Kirshenbaum, Westfield, N.J., assignors to Esso Research and Engineering Company, a corporation of Delaware
No Drawing. Filed June 26, 1964, Ser. No. 378,446
6 Claims. (Cl. 260—67)

The present invention relates to a new copolymer and relates particularly to a copolymer of formaldehyde and carbon monoxide which contains less than 50 mole percent of carbon monoxide. This invention further relates to a process for preparing the aforementioned copolymer. In particular, this invention relates to the copolymerization of formaldehyde and carbon monoxide in an inert, anhydrous organic solvent with a catalyst selected from the group consisting of ferric chloride, zinc chloride, antimony trifluoride, hydrogen fluoride, boron trifluoride, boron trifluoride monohydrate, boron trifluoride-phosphoric acid complex ($BF_3 \cdot H_3PO_4$), phosphoric acid, iron hydrocarbonyl, cobalt hydrocarbonyl, nickel hydrocarbonyl and the combination of a free radical generator with a reducing agent.

Formaldehyde is a well-known compound in the field of organic chemistry. It readily condenses with many and varied compounds to form commercially useful products. Condensation products of formaldehyde with aromatics, e.g., toluene and xylene, other aldehydes, as well as the homopolymer, polyformaldehyde, have been reported. Carbon monoxide, on the other hand, has up to this time only been copolymerized with ethylene and, to a minor extent, with other olefins.

Carbon monoxide reacts with aqueous formaldehyde in a 1:1 mole ratio to form glycolic acid. Glycolic acid in turn can be polymerized to a polyglycolic ester as a result of the esterification reaction between molecules of glycolic acid. However, up to this time, it has been impossible to copolymerize formaldehyde and carbon monoxide to produce a polymer containing less than 50 mole percent of carbon monoxide. It has now been discovered that a formaldehyde-carbon monoxide copolymer, containing less than 50 mole percent of carbon monoxide, e.g., from about 5 to about 45 mole percent, can be prepared by dissolving the two reactants in an inert, substantially anhydrous organic solvent and contacting them with a suitable catalyst under selected conditions of temperature and pressure.

It is therefore an object of the present invention to prepare a novel formaldehyde-carbon monoxide copolymer as well as define a process for its preparation. Other objects, as well as advantages of the present invention, will become clear from the following description and examples.

According to the present invention, carbon monoxide and formaldehyde, both desirably of high purity, are copolymerized in an inert, substantially anhydrous organic solvent with a suitable catalyst or catalyst system at a temperature of from about −50° C. to about 275° C. and a pressure of from about 5 p.s.i.a. to about 50,000 p.s.i.a. The resulting polymer product is a copolymer containing less than 50 mole percent carbon monoxide and ranging in viscosity average molecular weight from about 1,000 to about 1,000,000.

The reactants involved in the instant novel process, namely formaldehyde and carbon monoxide, are both commercially available. Carbon monoxide is available in abundant quantities and is a well-known industrial gas. Formaldehyde is prepared commercially by the catalytic vapor phase oxidation of methanol using air as the oxidizing agent and heated silver, copper, alumina, or coke as catalysts or catalyst components. Formaldehyde is also manufactured directly from natural gas, methane and other aliphatic hydrocarbons. The most common commercial form of formaldehyde is an aqueous solution containing 37% by weight dissolved formaldehyde plus sufficient methanol, as a stabilizer, to prevent formation and precipitation of polyformaldehyde or paraldehyde. However, this form of formaldehyde is not useful in the present process, unless the water and methanol are removed, since polymerization according to the present novel process takes place under essentially anhydrous conditions. The two principal commercially available polymers of formaldehyde are paraformaldehyde, which is a linear polymer of varying composition, and trioxane, which is a cyclic trimer of definite composition, i.e. $(CH_2O)_3$. Trioxane is very stable at ordinary temperatures and easily depolymerizes to a very reactive form of formaldehyde. A preferred source of formaldehyde for the present novel process is trioxane; however, paraformaldehyde can also be used.

Both the carbon monoxide and the formaldehyde utilized in the instant process should be of high purity. The carbon monoxide should be at least 95% pure and preferably should be 99+% pure. Traces of gas, inert under reaction conditions, e.g., nitrogen and carbon dioxide, are not objectionable. The formaldehyde used should be at least from about 99.5% to about 99.9% pure and preferably should be of 99.9+% purity. Similarly, minute traces of impurities in the formaldehyde, which are inert under polymerization conditions, are not offensive. Actually, minute traces of some impurities in the reaction mixture can promote the polymerization reaction.

The present novel process is carried out in an inert, substantially anhydrous organic solvent. Trace quantities of water, e.g., <10 p.p.m. can be tolerated but large amounts must be avoided to prevent formation of glycolic acid. Typical examples of the solvents which can be used with one or more of the catalysts set forth hereafter are $C_3$–$C_{10}$ aliphatic and alicyclic hydrocarbons, such as butane, octane, cyclohexane, cyclooctane, isopentane, isohexane, n-hexane, n-heptane, etc.; aromatic hydrocarbons, such as benzene, toluene and xylene; halogenated solvents such as ethyl chloride, carbon tetrachloride, chlorobenzene, chloroform, tetrachloro-ethylene, ethylene dichloride, etc.; nitro compounds such as nitroethane and nitromethane; and other common suitable organic solvents such as ethyl acetate, methanol, ethanol, acetone, acetonitrile, ethyl ether, diisopropyl ether and meta- or paradioxane, but preferably paradioxane. Polar solvents are particularly advantageous since they increase the solubility of the carbon monoxide. Attention should be given to the selection of the solvent to be used in combination with a particular catalyst so that catalyst activity is not markedly decreased by, for example, interaction between the catalyst and solvent. To illustrate, it is preferred not to use solvents such as methanol or ethanol with halogenated or very acidic catalysts. On the other hand, trichloroethylene is particularly useful with ferric chloride and paradioxane is useful with most of the catalysts utilized.

The temperature at which copolymerization takes place can vary from about −50° C. to about 275° C., and preferably from about −25° C. to about 200° C. Polymerization pressures will vary from about 5 p.s.i.a. to about 50,000 p.s.i.a. and preferably from about 1,000 p.s.i.a. to about 20,000 p.s.i.a. High pressures favor the polymerization reaction for he reason that the solubility of carbon monoxide in the inert, anhydrous organic solvent is thereby increased.

The catalysts which are used to copolymerize formaldehyde and carbon monoxide according to the present novel method can be arbitrarily categorized into two groups.

The first group of catalysts which can be employed include ferric chloride, zinc chloride, antimony trifluoride hydrogen fluoride, boron trifluoride, boron trifluoride monohydrate, boron trifluoride-phosphoric acid complex ($BF_3 \cdot H_3PO_4$), phosphoric acid, iron hydrocarbonyl, cobalt hydrocarbonyl and nickel hydrocarbonyl.

The second type of catalyst which can be utilized in the present novel method is a redox catalyst system comprising a combination of (1) a free radical generator, such as a peroxide or diperoxide, and (2) a reducing agent, such as organic amines, arsines and phosphines, or organic and inorganic metal salts that are soluble in the reaction media.

In general, the peroxidic compounds of the present process can be defined as those oxygen-containing compounds which upon decomposition yield free radicals. Peroxides and diperoxides employed with the aforementioned redox catalyst system can be represented by the following structural formulae:

$$R_1-O-O-R_2 \quad (I)$$

$$R_1-O-O-R_3-O-O-R_2 \quad (II)$$

wherein $R_1$ and $R_2$ are each selected from the group consisting of hydrogen, $C_1$ to $C_{20}$ alkyl, aryl, $C_3$ to $C_{10}$ cycloalkyl, hydroxy substituted $C_3$ to $C_{10}$ cycloalkyl, $C_1$ to $C_{20}$ acyl, halogen substituted $C_1$ to $C_{20}$ acyl, alkaryl, aralkyl and $C_1$ to $C_{20}$ carboalkoxy; and $R_3$ is selected from the group consisting of carbonyl, $C_1$ to $C_{20}$ diacyl and $$-(CH_2)_n-$$

where $n$ is an integer of from 1 to 20, preferably 1 to 10. In a preferred embodiment $R_1$ and $R_2$ are each selected from the group consisting of hydrogen, $C_1$ to $C_{20}$ alkyl and $C_1$ to $C_{20}$ acyl. The type and kind of peroxide utilized in the present process is not critical. What is important is the presence of a peroxidic compound that yields a free radical upon decomposition.

Suitable examples of peroxides and diperoxides which can be employed include: hydrogen peroxide, ditertiary butyl peroxide, benzoyl peroxide, tertiary butyl hydroperoxide, dicumene peroxide, cumene hydroperoxide, 2,5-dimethyl-2,5-di(tertiary butyl peroxy)hexyne-3, 2,5-dimethyl-2,5-di(tertiary butyl peroxy) hexane, cyclopentyl hydroperoxide, 2,5-dimethyl-2,5-dihydroperoxy hexane, tertiary butyl peroxy isopropyl carbonate, p-menthane hydroperoxide, diisopropylbenzene hydroperoxide, methyl cyclohexane hydroperoxide, tertiary butyl peroxy pivalate, isopropyl percarbonate, cyclohexanone peroxide, methyl ethyl ketone peroxide, tertiary butyl perbenzoate, and lauroyl peroxide. Other free radical sources such as azobisiso - butyronitrile, bis(1 - hydroxycyclohexyl)peroxide, 2,4-dichlorobenzoyl peroxide and di-tertiary-butyl diperphthalate can also be used.

Reducing agents which are employed in combination with the aforementioned peroxides and diperoxides in accordance with the instant redox catalyst system are, in general, secondary amines, tertiary amines, tertiary arsines, tertiary phosphines and organic and inorganic metal salts which are capable of reducing peroxides. The amines which can be used are represented by the following formula:

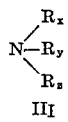

III wherein $R_y$ and $R_z$ are each selected from the group consisting of $C_1$ to $C_{20}$ alkyl, $C_3$ to $C_{10}$ cycloalkyl, aralkyl, alkaryl, aryl; and $R_x$ is selected from the group consisting of hydrogen, $C_1$ to $C_{20}$ alkyl, $C_3$ to $C_{10}$ cycloalkyl, aralkyl, alkaryl and aryl.

Suitable examples of amines which may be utilized include: tri-n-butyl amine, diethyl amine, tri-n-propylamine, tri-n-decylamine, tri-n-pentadecylamine, β-phenylethyl di-n-butyl amine, diethyl phenyl amine, cyclohexyl di-n-butyl amine and dimethyl para-methylphenyl amine.

The tertiary arsines and phosphines can be represented generally by the formulae $(R_4)_3P$ and $(R_4)_3As$, wherein $R_4$ is a hydrocarbon of from about 1 to about 20 carbon atoms, e.g., $C_1$ to $C_{20}$ alkyl, aryl, alkaryl and aralkyl. Examples of arsines and phosphines which can be utilized as the reducing agent include: triphenyl phosphine, trimethyl phosphine, triethyl phosphine, tridodecyl phosphine, triphenyl arsine, tri-(p-methylphenyl)arsine, tri-(phenylethyl)arsine and trihexadecyl phosphine.

The soluble inorganic and organic metal salts that can be utilized as reducing agents are generally the soluble salts of a metal which is in a valence state less than maximum, said metal being selected from the variable valent metals of groups I–B, IV, V–B, VI–B, VII–B and VIII of the Periodic Chart of the Elements according to the Fisher Scientific Company as reproduced on pp. 392–93 of the Handbook of Chemistry and Physics, 35th edition, 1953. Examples of suitable salts include: ferrous sulfate, cuprous chloride, stannous chloride, ferrous chloride, cobaltous chloride, manganous laurate, cuprous naphthenate, ferrous porphyrazine and cuprous stearate.

The amount of reducing agent utilized in the present redox catalyst system is that quantity necessary to initiate decomposition of the peroxidic compound. Generally, the mole ratio of peroxidic compound to reducing agent varies from about 0.25:1 to about 1.5:1.

Typical redox catalyst systems which can be used are: di-tertiary butyl peroxide and tri-n-butyl amine; benzoyl peroxide and copper laurate; dicumene peroxide and dodecyl trimethyl ammonium bromide, 2,5-dimethyl-2,5-di(tert.-butyl peroxy)hexyne-3 and dimethylaniline, dicumene peroxide and triphenyl phosphine, isopropyl percarbonate and tri-n-propylamine, di-tert.-butyl diperphthalate and phenylethanol amine, bis-(1-hydroxycyclohexyl) peroxide and N,N-dimethyl-p-toluidine, methyl ethyl ketone peroxide and triethylene diphosphite, and p-methane hydroperoxide and manganese naphthenate.

The total amount of catalyst required for the polymerization reaction can be varied over a wide range. Generally, the amount of catalyst utilized should not be less than about 0.01 wt. percent, based on total monomer reacted, nor more than about 15 wt. percent on the same basis. A preferred catalyst range is from about 0.1 to about 5 wt. percent, based on the total amount of monomer reacted. Excessive amounts of catalyst should be avoided where the catalyst residue can darken the polymer and affect polymer properties.

The exact manner in which the polymerization is carried out can vary. In one embodiment, the solvent and catalyst are charged to the reactor. Carbon monoxide under pressure is then admitted to the reaction vessel followed by vigorous agitation to aid in its solution. When the solvent is saturated with carbon monoxide and the desired temperature and pressure are reached, formaldehyde feed is charged to the reactor as a gas or in additional solvent and polymerization is allowed to occur. Alternatively, both the carbon monoxide and formaldehyde are dissolved in the inert organic solvent in the desired quantities, followed by the addition of the catalysts. In yet another modification, the carbon monoxide, formaldehyde and catalyst are added simultaneously. The exact method by which the polymerization is carried out is not critical to the present novel process and can be varied to suit changing needs and circumstances. Both batch and continuous polymerization processes can be used.

Good gas-liquid contact, as for example by vigorous agitation, is desirable to provide and maintain a satisfactory rate of solution of carbon monoxide in the solvent for the reason that formaldehyde polymerizes much more rapidly than carbon monoxide. Furthermore, in order to favor the incorporation of carbon monoxide into the polymer product, the ratio of carbon monoxide to formaldehyde in the reactor must be kept high.

Copolymers containing from about 1 to about 45 mole percent of carbon monoxide can be made by this novel process and the final product composition will depend on the ratio of carbon monoxide to formaldehyde in the reactor, the temperature and pressure at which the polymerization is performed and the particular catalyst utilized. In general, the mole ratio of carbon monoxide to formaldehyde in the reactor will vary from about 0.1:1 to about 100:1, preferably from about 5:1 to about 100:1 and more preferably from about 10:1 to about 100:1. A mole ratio of from about 0.1:1 to about 1:1 is used where only small amounts of carbon monoxide are to be incorporated into the polymer product. Since formaldehyde is so much more reactive than carbon monoxide, it should not be permitted to contact the catalyst except in the presence of carbon monoxide in order to prevent it from homopolymerizing.

The resulting polymer product varies from a liquid to a solid with a softening point above about 100° C. Viscosity average molecular weights of the polymers range from between about 1,000 and about 1,000,000 or more. The copolymer product contains less than 50 mole percent carbon monoxide and advantageously contains from about 5 to about 45 mole percent carbon monoxide. In general, the solid polymer product has a moderately high impact resistance and very good solvent resistance except in the presence of strong acids or bases. The higher molecular weight solids show good resistance to creep or flow under load. The solid polymer can be used to make films, molded articles, fibers and extruded items. The lower molecular weight copolymers are especially useful in adhesive formulations and for plasticizer applications.

The stability of the polymer product can be improved by blocking any free hydroxyl groups that may be present by converging them to esters with acetic anhydride or methylating them, for example with diazomethane. Hydroxyl groups can also be stabilized by reaction with ethylene oxide, propylene oxide or long chain epoxides. Conventional stabilizers or inhibitors such as urea, substituted ureas, phosphites, phenolic compounds, phenolic sulfides and aromatic amines may be added to the polymer to improve its aging properties.

In addition to the instant novel copolymer of the present process, terpolymers can also be made by the addition of a third component to the reaction medium. Such terpolymers as formaldehyde-acetaldehyde-carbon monoxide and formaldehyde-acrolein-carbon monoxide can be made by the instant novel process. The latter polymer contains unsaturation and is curable.

The practice of the instant novel process is further illustrated by the following examples which are not intended to limit its scope.

EXAMPLE 1

A stainless steel, high pressure reactor containing an agitator is charged with one liter of n-octane and 5 grams of ditertiary butyl peroxide. Vigorous agitation is commenced and dry carbon monoxide is charged to the reactor until the pressure reaches about 5,000 p.s.i.a. Heat is then applied. Five grams of tri-n-butylamine are then simultaneously added to the reactor with a gaseous mixture of dry carbon monoxide and formaldehyde in a mole ratio of about 3:2. The CO/HCHO gaseous mixture is continuously added to the agitated contents of the reactor for two hours. During the course of the reaction, the pressure is maintained at from about 5,000 p.s.i.a to about 8,000 p.s.i.a. and the temperature maintained in the range of from about 115° C. to about 130° C. At the end of the polymerization reaction, the pressure is reduced and the volatile components flashed off by venting to the atmosphere. A white solid copolymer of carbon monoxide and formaldehyde, having a softening point above 100° C., is recovered.

EXAMPLE 2

The procedure of Example 1 is repeated except that: (1) 5 grams of benzoyl peroxide are used in lieu of the di-tertiary butyl peroxide and 5 grams of diethyl aniline are used in place of the tri-n-butylamine; (2) the reaction temperature is maintained at about 75° C. to about 95° C.; (3) the reaction pressure is stabilized at about 20,000 p.s.i.a.; and (4) the mole ratio of carbon monoxide to formaldehyde in the inlet streams is about 4:1. The white solid product produced has a softening point of about 150° C. and is composed of about 93 mole percent formaldehyde and about 7 mole percent carbon monoxide.

EXAMPLE 3

One liter of paradioxane is charged to a stainless steel, high pressure reactor containing an agitator. With constant and vigorous agitation, 7 grams of lauroyl peroxide and 5 grams of cuprous stearate are added to the p-dioxane. Gaseous, dry carbon monoxide is added to the reactor until the pressure reaches about 1,000 p.s.i.a A 10 wt. percent solution of monomeric formaldehyde in p-dioxane is then added to the reactor over a period of three hours at a rate of about 30 grams of formaldehyde per hour. During this period, the temperature is increased and finally maintained in the range of from about 75° C. to about 85° C. The pressure is stabilized at about 1,000 p.s.i.a by the frequent addition of carbon monoxide. At the end of about 5 hours the pressure is reduced and volatile components vented to the atmosphere. A white, powdery formaldehyde-carbon monoxide copolymer is recovered which comprises about 95 units of formaldehyde and about 5 units of carbon monoxide per 100 units of copolymer.

EXAMPLE 4

The procedure of Example 2 is repeated except for the following changes: (1) a mixture of isomeric alkylbenzenes containing a total of four carbon atoms in the side chains is used as the solvent in place of n-octane; (2) 2,5-dimethyl-2,5-di(tertiary butyl peroxy)hexane is used in place of the butyl peroxide; and (3) β-phenylethyl dibutyl amine is used in place of tri-n-butylamine. The reaction temperature is maintained in the range of about 190° C. to about 210° C. and the pressure is stabilized at about 22,000 p.s.i.a. by the use of dry, gaseous carbon monoxide. Formaldehyde is added in the form of trioxane dissolved in the isomeric alkylbenzenes for a period of about 5 hours. At the end of about 7 hours, the temperature is lowered to room temperature, and the reactor vented to the atmosphere. The copolymer formed is recovered from the slurry by filtration, washed with ether and air dried. The white copolymer product comprises about 55 mole percent formaldehyde and 45 mole percent carbon monoxide. The formaldehyde-carbon monoxide copolymer is stabilized by esterifying any free hydroxyl groups with acetic anhydride in a dioxane media.

EXAMPLE 5

Example 1 is repeated using toluene as the solvent in place of n-octane. The polymeric product contains both carbon monoxide and formaldehyde units and has a softening point of about 90° C.

EXAMPLE 6

1200 cc. of dioxane is placed in a stainless steel pressure vessel and 10 grams of paraformaldehyde are added. The vessel is closed and pressured to about 15,000 p.s.i.a. with carbon monoxide. After raising the temperature to about 115° C., a solution of 90 grams of paraformaldehyde in dioxane is simultaneously added with a solution of 4 grams of tertiary butyl perbenzoate and 2 grams of cyclohexyl-di-n-butylamine in dioxane over a period of about two hours to the vessel. After a total of about three hours, the temperature is lowered, the pressure released and the polymer product slurry filtered and washed with dioxane. The solid polymeric product contains carbon monoxide and formaldehyde in a mole ratio of about 30:70.

EXAMPLE 7

In an analogous procedure to Example 6, 10 grams of the catalyst, consisting of tertiary butyl peroxypivalate, is added to the reactor, which is charged with mixed xylenes in place of dioxane. The reactor is then heated to a temperature of between about 110° C. and about 120° C. and pressured to 45,000 p.s.i.a. with carbon monoxide. Trioxane (100 grams) and 5 grams of dimethyl aniline, dissolved in mixed xylenes, are added over a period of three hours. At the end of a total of about four hours, a white solid product containing about 35 mole percent carbon monoxide is recovered.

EXAMPLE 8

A glass lined autoclave is charged with 1 liter of n-heptane containing 10 grams of $BF_3 \cdot H_3PO_4$ catalyst and the temperature lowered to $-50°$ C. Dry, gaseous carbon monoxide is then charged to the autoclave at 10,000 p.s.i.a. and formaldehyde in the form of a 20 wt. percent solution in p-dioxane is added over a period of eight hours. During the last half of this period, the temperature is permitted to rise to room temperature and then is increased to about 100° C. A white solid polymer product is obtained which by degradation analysis is shown to contain both formaldehyde and carbon monoxide units. The polymer product has a softening point above about 90° C.

EXAMPLE 9

A glass lined, magnetically stirred autoclave is charged with 500 ml. of trichloroethylene-n-heptane solvent containing 10 grams of ferric chloride ($FeCl_3$). Dry, gaseous carbon monoxide is charged at 30,000 p.s.i.a. and 50 grams of trioxane, dissolved in the mixed trichloroethylene-heptane solvent, is pressured in at ambient temperature over a period of 6 hours. The temperature is slowly raised to 100° C. over the last four hours and the pressure released at the end of the reaction. The resultant product comprises a low molecular weight, white solid which contains both formaldehyde and carbon monoxide units in the polymer chain.

EXAMPLE 10

The procedure of Example 9 is repeated using $ZnCl_2$ as the catalyst. Carbon monoxide pressure is maintained at 30,000 p.s.i.a. while a paraformaldehyde suspension in a p-dioxane-n-heptane mixed solvent is pressured in at $-20°$ C. After 4 hours, the temperature is slowly raised to 100° C. The pressure is then released and a white solid recovered. The presence of both carbon monoxide and formaldehyde units in the polymeric solid is shown by pyrolytic decomposition analysis.

EXAMPLES 11–12

The procedure of Example 9 is repeated successively with $SbF_3$ and HF as the catalysts. Temperatures are maintained in the range of about $-20°$ C. to about 100° C. and the pressure at about 30,000 p.s.i.a. In each run small amounts of white solid are obtained which upon infra-red or pyrolytic decomposition analysis are shown to contain both carbon monoxide and formaldehyde units.

EXAMPLE 13

In an analogous procedure to Example 9, carbon monoxide and formaldehyde are copolymerized with boron trifluoride ($BF_3$) as the catalyst at a temperature of between about 100° C. and 175° C. and a pressure of about 10,000 p.s.i.a. A copolymer, containing both carbon monoxide and formaldehyde units, is recovered.

EXAMPLE 14

To a glass-lined autoclave is charged one liter of a toluene-hexane mixture containing 5 grams of cobalt hydrocarbonyl, $HCo(CO)_4$, at $-40°$ C. Carbon monoxide is pressured in at 10,000 p.s.i.a. and the temperature lowered to about $-30°$ C. Liquid formaldehyde at $-30°$ C. is then pressured into the autoclave and the temperature allowed to rise to room temperature. The reaction mixture is heated to 100° C. over a period of 6 hours and the pressure released. The white, solid polymeric product recovered contains about 5 mole percent carbon monoxide.

EXAMPLE 15

In a similar manner to Example 14, carbon monoxide and formaldehyde are copolymerized with phosphoric acid ($H_3PO_4$) as the catalyst over a reaction period of about 8 hours. A polymer product, containing both carbon monoxide and formaldehyde units as shown by infra-red analysis, is recovered.

While there are above described a number of specific embodiments of the present invention, it is obviously possible to produce other embodiments and various equivalent modifications and variations thereof without departing from the spirit of the invention.

Having set forth the general nature and specific embodiments of the present invention, the true scope is now particularly pointed out in the appended claims.

What is claimed is:

1. A process for copolymerizing carbon monoxide with formaldehyde as the sole reactants to a copolymer of less than 50 mole percent carbon monoxide which comprises reacting carbon monoxide and formaldehyde in an inert, substantially anhydrous organic solvent at a temperature of from about $-50°$ C. to about 275° C. and at a pressure of from about 5 p.s.i.a. to about 50,000 p.s.i.a. with a catalyst system which comprises, in combination, (1) a peroxidic compound and (2) a reducing agent selected from the group consisting of secondary amines, tertiary amines, tertiary arsines, tertiary phosphines, and soluble salts of the variable valent metals of Groups I–B, IV, V–B, VI–B, VII–B and VIII, said metals being in a valence state less than maximum.

2. A process according to claim 1 wherein the polymerization temperature is from about $-25°$ C. to about 200° C.

3. The process according to claim 1, wherein the polymerization pressure is from about 1,000 p.s.i.a. to about 20,000 p.s.i.a.

4. A process for copolymerizing carbon monoxide with formaldehyde as the sole reactants to a copolymer of less than 50 mole percent carbon monoxide which comprises reacting carbon monoxide and formaldehyde in an inert, substantially anhydrous organic solvent at a temperature of from about $-50°$ C. to about 275° C. and at a pressure of from about 5 p.s.i.a. to about 50,000 p.s.i.a. with a catalyst system comprising, in combination, (1) ditertiary butyl peroxide and (2) tri-n-butylamine.

5. A process for copolymerizing carbon monoxide with formaldehyde as the sole reactants to a copolymer of less than 50 mole percent carbon monoxide which comprises reacting carbon monoxide and formaldehyde in an inert, substantially anhydrous organic solvent at a temperature of from about $-50°$ C. to about 275° C. and at a pressure of from about 5 p.s.i.a. to about 50,000 p.s.i.a. with a catalyst system comprising, in combination, (1) 2,5-dimethyl-2,5-di(tertiary butyl peroxy)hexane and (2) β-phenylethyl dibutyl amine.

6. A process for copolymerizing carbon monoxide with formaldehyde as the sole reactants to a copolymer of less than 50 mole percent carbon monoxide which comprises reacting carbon monoxide and formaldehyde in an inert, substantially anhydrous organic solvent at a temperature of from about $-50°$ C. to about 275° C. and at a pressure of from about 5 p.s.i.a. to about 50,000 p.s.i.a. with a catalyst system comprising, in combination, (1) tertiary butyl peroxypivalate and (2) dimethyl aniline.

(References on following page)

References Cited

UNITED STATES PATENTS

| | | | |
|---|---|---|---|
| 2,211,625 | 8/1940 | Loder | 260—484 |
| 2,391,218 | 12/1945 | Bacon et al. | 260—94 |
| 2,495,286 | 1/1950 | Brubaker | 260—63 |
| 2,734,886 | 2/1956 | Starr | 260—67 |
| 2,795,571 | 6/1957 | Schneider | 260—67 |
| 2,989,510 | 6/1961 | Bruni | 260—67 |
| 2,989,511 | 6/1961 | Schnizer | 260—67 |
| 3,002,952 | 10/1961 | O'Connor | 260—67 |
| 2,152,852 | 4/1939 | Loder | 260—535 |
| 2,153,064 | 4/1939 | Larson | 260—530 |
| 2,331,094 | 10/1943 | Loder | 260—484 |
| 2,371,990 | 3/1945 | Hanford | 260—67 |

FOREIGN PATENTS

| | | |
|---|---|---|
| 630,942 | 11/1963 | Belgium. |
| 836,288 | 6/1960 | Great Britain. |
| 906,959 | 9/1962 | Great Britain. |

WILLIAM H. SHORT, *Primary Examiner.*

L. M. PHYNES, *Assistant Examiner.*